Patented Jan. 22, 1929.

1,699,888

UNITED STATES PATENT OFFICE.

HEINRICH GÜNZLER, OF ELBERFELD, GERMANY, ASSIGNOR TO WINTHROP CHEMICAL COMPANY, INC., OF NEW YORK, N. Y.

PROCESS FOR THE MANUFACTURE OF ALKALI-METAL SALTS OF HALOGENATED AMIDES OF AROMATIC SULPHONIC ACIDS.

No Drawing. Application filed October 12, 1925, Serial No. 62,195, and in Germany October 18, 1924.

I have discovered that alkali metal salts of the halogenated amides of aromatic sulfonic acids can be manufactured in a technically very advantageous manner by decomposing toluene sulfonamides or their salts in concentrated aqueous solutions by means of bleaching powder and at the same time, or subsequently, causing to interact therewith an alkali metal salt, which will produce with the calcium of the resulting calcium salt an insoluble or difficultly soluble inorganic precipitate. After filtering the resulting reaction mixture, the resulting alkali metal salts of the halogenated sulfonamides crystallize out on cooling completely free from calcium and in good yield.

It is remarkable that under the above conditions good yields can be obtained at all, considering the sensitive nature of the products in question, in view of the elevated temperature required for the separation of the alkali metal salts of the halogenated sulfonamides.

Contrasted with the known process for the manufacture of the alkali metal salts in question, the new process involving the salting out the calcium salt solutions with common salt, offers several technical advantages. It is possible to carry out the operation in much smaller vessels and the production of the alkali metal salts free from calcium can be effected with certainty even without careful and prolonged washing.

A sodium hypochlorite solution may be used in place of bleaching powder, so as to obtain a stable chrystallizable sodium salt quite easily and in one operation. The use of sodium hypochlorite in the solid form is impracticable on account of its high instability.

The following examples serve to illustrate the invention:

Example 1.

22.9 parts by weight of bleaching powder containing 62.1% of active chlorine, 34 parts by weight of p.toluol sulfonamide and 14.5 parts by weight of calcined sodium carbonate are stirred with 100 parts by weight of water, in consequence of which the temperature rises by itself to about 50° C. The reaction mixture is then heated to about 60–70° C., with stirring, and the calcium carbonate formed is separated while still hot. On cooling the clear solution, crystals of sodium p-toluolsulfo-chloro-amide containing 3 molecules of water of crystallization separate out. The yield amounts of 48 parts by weight of the sodium salt.

The p-toluol-sulfo-chloro-amide has most probably the formula:

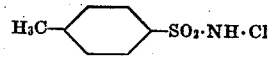

Example 2.

22.9 parts by weight of bleaching powder containing 62.1% of active chlorine and 38.2 parts by weight of calcium p-toluolsulfonamide are stirred with 100 parts by weight of water and 76.5 parts by weight of Glauber's salt ($Na_2SO_4.10H_2O$) are added. The reaction product is then worked up exactly as heretofore described: the yield amounts to 47 parts by weight of the sodium salt of the p-toluolsulfonic acid chloroamide.

Example 3.

24.1 parts by weight of bleaching powder containing 59.1% of active chlorine; 34 parts by weight of o.toluol sulfonamide, and 15.5 parts by weight of calcined sodium carbonate are stirred with about 200 parts by weight of water and then worked up as described above. The yield amounts to 44 parts by weight of the air dried sodium salt of o-toluolsulfo-chloro-amide, containing 2 molecules of water of crystallization.

I claim:

1. Process for the manufacture of an alkali metal salt of a halogenated amide of an aromatic sulfonic acid compound which comprises decomposing an amide of an aromatic sulfonic acid compound, in concentrated aqueous solution, by treatment with bleaching powder thereby forming a halogenated calcium salt of the amide of the aromatic sulfonic acid compound, and causing to react therewith an inorganic alkali metal salt capable of forming with the calcium of said calcium salt a substantially insoluble inorganic compound of calcium to the production of the soluble alkali metal salt of said halogenated amide of the aromatic sulfonic acid compound.

2. Process for the manufacture of an alkali metal salt of a halogenated amide of an aromatic sulfonic acid, which comprises decomposing a salt of an amide of an aromatic sulfonic acid, in concentrated aqueous solution, by treatment with bleaching powder thereby forming a calcium salt of the halogenated amide of the aromatic sulfonic acid, and causing to react therewith an inorganic alkali metal salt capable of forming with the calcium of said calcium salt a substantially insoluble inorganic compound of calcium to the production of the soluble alkali metal salt of said halogenated amide of the aromatic sulfonic acid.

3. Process for the manufacture of an alkali metal salt of a halogenated amide of an aromatic sulfonic acid compound which comprises decomposing an amide of an aromatic sulfonic acid compound in concentrated aqueous solution, by treatment with bleaching powder at 60–70° C., thereby forming a calcium salt of the halogenated amide of the aromatic sulfonic acid compound, causing to react therewith an inorganic alkali metal salt capable of forming with the calcium of said calcium salt substantially insoluble inorganic compound of calcium to the production of the soluble alkali metal salt of said halogenated amide of the aromatic sulfonic acid compound, separating the said insoluble compound of calcium, cooling the solution, and recovering the so-precipitated alkali metal salt of the halogenated amide of the aromatic sulfonic acid compound.

In testimony whereof I have hereunto set my hand.

HEINRICH GÜNZLER.